(12) United States Patent
Kurokawa et al.

(10) Patent No.: US 8,529,989 B2
(45) Date of Patent: Sep. 10, 2013

(54) METHOD FOR MANUFACTURING MAGNETIC RECORDING LAYER HAVING TWO OR MORE LAYERS

(75) Inventors: Gohei Kurokawa, Ichihara (JP); Yuzo Sasaki, Ichihara (JP)

(73) Assignee: Showa Denko K.K., Tokyo (JP)

( * ) Notice: Subject to any disclaimer, the term of this patent is extended or adjusted under 35 U.S.C. 154(b) by 66 days.

(21) Appl. No.: 12/681,270

(22) PCT Filed: Oct. 2, 2008

(86) PCT No.: PCT/JP2008/067934
§ 371 (c)(1),
(2), (4) Date: May 4, 2010

(87) PCT Pub. No.: WO2009/044811
PCT Pub. Date: Apr. 9, 2009

(65) Prior Publication Data
US 2010/0221579 A1 Sep. 2, 2010

(30) Foreign Application Priority Data
Oct. 3, 2007 (JP) .............................. P2007-259304

(51) Int. Cl.
*G11B 5/66* (2006.01)

(52) U.S. Cl.
USPC ........... 427/130; 427/127; 427/128; 427/131; 428/827; 428/829; 428/830

(58) Field of Classification Search
USPC ................................................. 427/130–131
See application file for complete search history.

(56) References Cited

U.S. PATENT DOCUMENTS 4,230,773 A * 10/1980 Bakos ........................... 428/447
7,470,474 B2 12/2008 Sakawaki et al.
2004/0213949 A1 10/2004 Umezawa et al.
2005/0142378 A1 * 6/2005 Nemoto et al. ................ 428/670
2005/0153169 A1 * 7/2005 Watanabe et al. ...... 428/694 BM
2006/0177703 A1 8/2006 Takenoiri et al.
2007/0248843 A1 * 10/2007 Wu et al. ........................ 428/827
2007/0298285 A1 * 12/2007 Berger et al. ............... 428/828.1
2008/0055777 A1 * 3/2008 Rou et al. ....................... 360/135
2008/0199735 A1 * 8/2008 Berger et al. ............... 428/828.1

FOREIGN PATENT DOCUMENTS

| JP | 03-071427 A | 3/1991 |
| JP | 2004-247035 A | 9/2004 |
| JP | 2004-310910 A | 11/2004 |
| JP | 2006-048900 A | 2/2006 |

* cited by examiner

*Primary Examiner* — Timothy Meeks
*Assistant Examiner* — Mandy Louie
(74) *Attorney, Agent, or Firm* — Sughrue Mion, PLLC

(57) ABSTRACT

The present invention relates to a method for manufacturing a perpendicular magnetic recording medium including a non-magnetic substrate, and at least a soft magnetic under layer, an orientation control layer, a magnetic recording layer constituted of two or more layers and a protective layer formed on the nonmagnetic substrate, the method including a step of forming a first magnetic recording layer having a granular structure constituted of ferromagnetic crystal grains and crystal grain boundaries made of a nonmagnetic oxide or nitride on the nonmagnetic substrate side, a step of forming a second magnetic recording layer constituted only of ferromagnetic crystal grains, a step of forming a surface unevenness control layer for decreasing surface unevenness of the first magnetic recording layer located between the first magnetic recording layer and the second magnetic recording layer, and a step of heating the nonmagnetic substrate so as to decrease a surface roughness Ra of the second magnetic recording layer to less than 2 nm. The present invention also relates to a magnetic recording and reproducing apparatus using the magnetic recording medium.

7 Claims, 3 Drawing Sheets

METHOD FOR MANUFACTURING MAGNETIC RECORDING LAYER HAVING TWO OR MORE LAYERS

TECHNICAL FIELD

The present invention relates to a method for manufacturing a perpendicular magnetic recording medium, and a magnetic recording and reproducing apparatus using the perpendicular magnetic recording medium.

BACKGROUND ART

In recent years, the range of applications for magnetic recording apparatuses such as magnetic disk drives, flexible disk drives and magnetic tape drives has been markedly increased and the importance of such apparatuses has also increased. Also, the recording density of the magnetic recording media used in such apparatuses is being largely increased. In particular, a steeper increase in areal recording density followed the introduction of an MR head and a PRML technique. Since the introduction of a GMR head and a TuMR head in recent years, the recording density has been increasing at a pace of about 30-40% per year.

Under these circumstances, there is demand for achieving a further increase in recording density with respect to magnetic recording media in the future and, hence, demand for achieving a higher coercive force, a higher signal-to-noise ratio (S/N ratio) and a higher resolution of a magnetic recording layer. In a longitudinal magnetic recording system widely used heretofore, the self-demagnetization of recording magnetic domains, i.e., the action of each of an adjacent pair of recording magnetic domains in a magnetization transition region weakening the magnetization of the other, becomes dominant with increases in linear recording density. There is a need to increase the magnetic shape anisotropy in a magnetic recording layer by continually reducing the thickness of the magnetic recording layer in order to avoid the self-demagnetization.

On the other hand, as the film thickness of a magnetic recording layer is reduced, the magnitude of an energy barrier for maintaining magnetic domains and the magnitude of thermal energy become so close in level to each other that a phenomenon in which a recorded amount of magnetization is relaxed under the influence of temperature (heat fluctuation phenomenon) is not negligible. This is said to be a determinant of the linear recording density.

In such circumstances, an anti-ferromagnetic coupling (AFC) medium has recently been proposed as a technical device to meet the demand for improving the linear recording density in the longitudinal magnetic recording system, and efforts are being made to avoid the thermal magnetization relaxation problem with longitudinal magnetic recording.

Perpendicular magnetic recording techniques are attracting attention as a promising technique for achieving a further increase in areal recording density. While a medium is magnetized in a direction along the surface of the medium in the conventional longitudinal magnetic recording system, a perpendicular magnetic recording system is characterized by magnetization in a direction perpendicular to the medium surface. Perpendicular magnetic recording is thought to be a way of avoiding the influence of self-demagnetization which is a hindrance to achievement of a higher linear recording density in the longitudinal magnetic recording system, and to be more suitable for recording at a higher density. Also, perpendicular magnetic recording is thought to be comparatively unsusceptible to thermal magnetization relaxation, which is the problem with longitudinal magnetic recording, because a certain magnetic layer thickness can be maintained in the case of perpendicular magnetic recording.

In ordinary cases, a perpendicular magnetic recording medium has a seed layer, an intermediate layer, a magnetic recording layer and an overcoat formed in this order on a nonmagnetic substrate. Also, in many cases, a lubricating layer is applied on the surface after film forming of the overcoat. Also, a magnetic film called a soft-magnetic under layer is ordinarily provided under the seed layer. The intermediate layer is formed for the purpose of further improving the characteristics of the magnetic recording layer. The seed layer has a function of aligning crystals in the magnetic recording layer and also of controlling the shape of magnetic grains.

It is important to control a magnetic exchange interaction between magnetic crystal grains of the magnetic recording layer so as to manufacture a perpendicular magnetic recording medium having excellent characteristics. Since a noise component increases when the exchange interaction is too strong, the recording and reproducing characteristics deteriorate. In contrast, when the exchange interaction is too weak, heat fluctuation characteristics deteriorate. In a conventionally used granular structure, ferromagnetic Co alloy crystals are surrounded with crystal grain boundaries made of a non-magnetic oxide or nitride, and the exchange interaction between magnetic crystal grains is controlled by the grain boundaries.

In the granular structure, it is difficult to control since the grain boundary width becomes ununiform, resulting in ununiform exchange interaction. Therefore, the exchange interaction on the film in-plane direction is uniformized by forming a magnetic recording layer including no grain boundaries made of an oxide or nitride on the magnetic recording layer having a granular structure, and thus the recording and reproducing characteristics are improved (Patent Document 1). However, because of surface unevenness caused by lamination of a seed layer, an intermediate layer and a granular magnetic recording layer, the magnetic recording layer including no grain boundaries made of an oxide or nitride is not a completely uniform continuous film, and also a layer in which each crystal grain is separated exists, resulting in ununiform exchange interaction.

It is necessary to obtain a perpendicular magnetic recording medium having excellent recording and reproducing characteristics, which can uniformize the exchange interaction in the film in-plane direction of a magnetic recording layer so as to improve the recording and reproducing characteristics in future. It has been required to obtain perpendicular magnetic recording medium which can solve such problems and also can be easily manufactured.

Patent Document 1:
  Japanese Unexamined Patent Application, First Publication No. 2004-310910

DISCLOSURE OF THE INVENTION

Problems to be Solved by the Invention

Under these circumstances, the present invention has been made and an object thereof is to provide a method for manufacturing a perpendicular magnetic recording medium, which is capable of recording and reproducing high density information by flattening a surface of a magnetic recording layer including no grain boundaries made of an oxide or nitride on a granular magnetic recording layer thereby uniformizing the exchange interaction, and to provide a magnetic recording and reproducing apparatus.

Means for Solving the Problems

In order to achieve the above object, the present invention provides the aspects shown below.

(1) A method for manufacturing a perpendicular magnetic recording medium including a nonmagnetic substrate, and at least a soft magnetic under layer, an orientation control layer, a magnetic recording layer constituted of two or more layers and a protective layer formed on the nonmagnetic substrate, the method including a step of forming a first magnetic recording layer having a granular structure constituted of ferromagnetic crystal grains and crystal grain boundaries made of a nonmagnetic oxide or nitride on the nonmagnetic substrate side, a step of forming a second magnetic recording layer constituted only of ferromagnetic crystal grains, a step of forming a surface unevenness control layer for decreasing surface unevenness of the first magnetic recording layer located between the first magnetic recording layer and the second magnetic recording layer, and a step of heating the nonmagnetic substrate so as to decrease a surface roughness Ra of the second magnetic recording layer to less than 2 nm.

(2) The method for manufacturing a perpendicular magnetic recording medium according to (1), wherein the film thickness of the surface unevenness control layer is within a range from 0.5 to 3 nm.

(3) The method for manufacturing a perpendicular magnetic recording medium according to (1) or (2), wherein at least one layer of the surface unevenness control layer has a face-centered cubic structure.

(4) The method for manufacturing a perpendicular magnetic recording medium according to any one of (1) to (3), wherein at least one layer of the surface unevenness control layer further has a hexagonal closest-packed structure.

(5) The method for manufacturing a perpendicular magnetic recording medium according to any one of (1) to (4), wherein at least one layer of the surface unevenness control layer is made of an alloy material which contains at least one element selected from the group of elements having a face-centered cubic structure as a main component, and elements selected from the group of elements having a body-centered cubic structure, and also has both a (111) plane-aligned crystalline structure and an irregular layer lattice formed by mixing a face-centered cubic structure with a body-centered cubic structure.

(6) The method for manufacturing a perpendicular magnetic recording medium according to any one of (1) to (5), wherein at least one layer of the surface unevenness control layer is made of an alloy material which contains at least one element selected from the group of elements having a face-centered cubic structure as a main component, and elements selected from the group of elements having a hexagonal closest-packed structure, and also has both a (111) plane-aligned crystalline structure and an irregular layer lattice formed by mixing a face-centered cubic structure with a hexagonal closest-packed structure.

(7) The method for manufacturing a perpendicular magnetic recording medium according to any one of (1) to (6), wherein at least one layer of the surface unevenness control layer is made of a Co alloy, which contains 40 atomic % or more of Co and 10 atomic % or less of Cr.

(8) The method for manufacturing a perpendicular magnetic recording medium according to any one of (1) to (7), wherein the nonmagnetic substrate is heated at a temperature within a range from 90 to 170° C. before formation of the surface unevenness control layer.

(9) The method for manufacturing a perpendicular magnetic recording medium according to any one of (1) to (7), wherein the nonmagnetic substrate is heated at a temperature within a range from 150 to 250° C. after formation of the surface unevenness control layer.

(10) The method for manufacturing a perpendicular magnetic recording medium according to any one of (1) to (9), wherein the nonmagnetic substrate is heated within a range from 3 to 10 seconds.

(11) A magnetic recording and reproducing apparatus including a magnetic recording medium, and a magnetic head for recording information on the magnetic recording medium and reproducing information from the magnetic recording medium, wherein the magnetic recording medium is the magnetic recording medium manufactured by the method according to any one of (1) to (10).

Effects of the Invention

According to the present invention, it is possible to provide a perpendicular magnetic recording medium having excellent high recording density characteristics by flattening a surface of a magnetic recording layer including no grain boundaries made of an oxide or nitride on a granular magnetic recording layer thereby uniformizing the exchange interaction.

BRIEF DESCRIPTION OF THE DRAWINGS

FIG. 2A is a graph showing an M-H curve or a $\theta_k$-H curve of a medium determined by a conventional method. This curve is expressed by (a) as a loop A in the drawing.

FIG. 2B is a graph showing a curve obtained by decreasing an external magnetic field from a state where the magnetization is saturated, inverting the sweep direction of the external magnetic field at the point "a" where M or $\theta_k$ becomes 0, and increasing the external magnetic field again until the magnetization is saturated. This curve is indicated by (b) as a loop B in the drawing.

FIG. 2C is a graph for explaining a method for determining coercive force distribution from the loop A and the loop B.

DESCRIPTION OF REFERENCE NUMERALS

Figure 1:
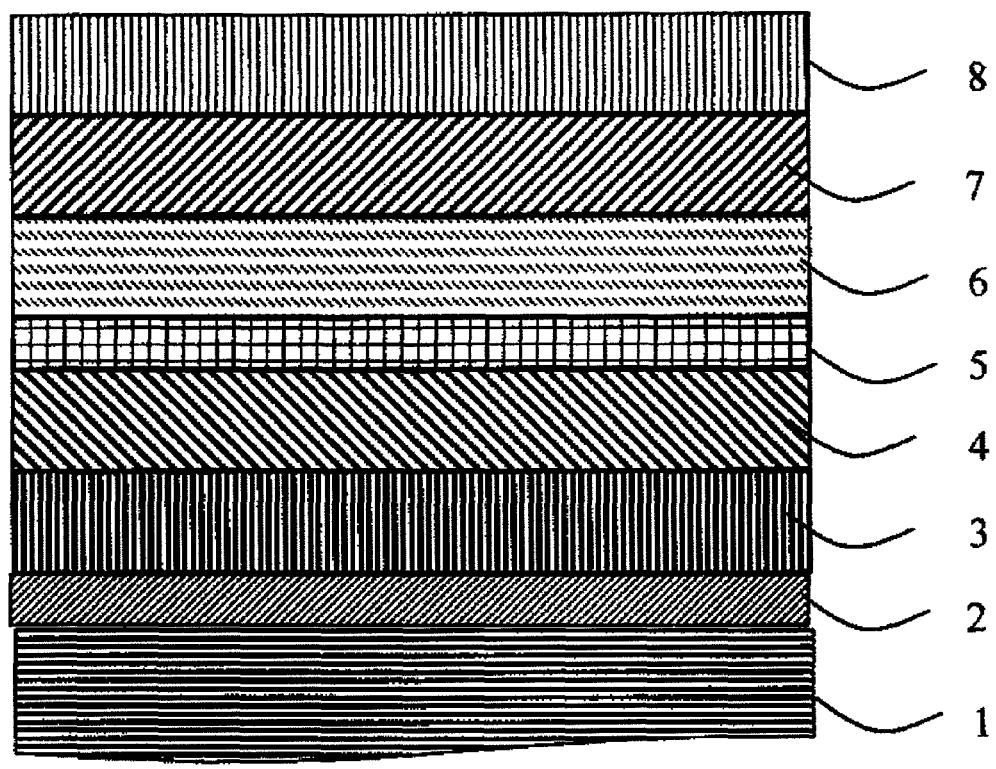
FIG. 1 is a diagram showing a cross-sectional structure of a perpendicular magnetic recording medium according to the present invention.

| | Description of Reference Numerals |
|---|---|
| 1: | Nonmagnetic substrate |
| 2: | Soft magnetic under layer |
| 3: | Seed layer |
| 4: | Intermediate layer |
| 5: | First magnetic recording layer |
| 6: | Surface unevenness control layer |

-continued

Description of Reference Numerals

| | |
|---|---|
| 7: | Second magnetic recording layer |
| 8: | Protective layer |
| 100: | Magnetic recording medium |
| 101: | Medium drive unit |
| 102: | Magnetic head |
| 103: | Head drive unit |
| 104: | Recording and reproduction signal processing system |

BEST MODE FOR CARRYING OUT THE INVENTION

The content of the present invention will be specifically explained.

As shown in FIG. 1, a perpendicular magnetic recording medium 100 manufactured by the manufacturing method of the present invention is a perpendicular magnetic recording medium including a nonmagnetic substrate 1, and at least a soft magnetic under layer 2, a seed layer 3 and an intermediate layer 4 constituting an orientation control layer for controlling alignment of a film immediately above, a first magnetic recording layer 5 in which an easy axis of magnetization (crystal c-axis) is aligned which is mainly perpendicular to the nonmagnetic substrate, a surface unevenness control layer 6, a second magnetic recording layer 7 and a protective layer 8 formed on the nonmagnetic substrate. The orientation control layer can also be applied in an ECC medium and new perpendicular recording media such as discrete track media and pattern media, to which a further improvement in the recording density is expected.

As the nonmagnetic substrate used in the magnetic recording medium of the present invention, any nonmagnetic substrate such as an Al alloy substrate containing Al as a main component, for example, an Al—Mg alloy, or a substrate made of ordinary soda glass, aluminosilicate glass, amorphous glass, silicon, titanium, ceramic, sapphire, quartz, or any of various resins, can be used. Among these substrates, an Al alloy substrate or a glass substrate made of crystallized glass or amorphous glass etc. is often used. In the case of a glass substrate, a mirror-polished substrate and a low-Ra substrate of Ra<1 (Å) are preferable. The substrate may have a texture if it is insignificant.

In ordinary cases of a process of manufacturing a magnetic disk, cleaning and drying of a substrate are first performed. Also in the present invention, in terms of ensuring adhesion of each layer, it is desirable to perform cleaning and drying before forming of the layer. Cleaning includes cleaning by etching (inverse sputtering) as well as cleaning with water. The substrate size is not particularly specified.

Each layer of the perpendicular magnetic recording medium will be explained below.

The soft magnetic under layer is provided in many perpendicular magnetic recording media. The soft magnetic under layer has the function of introducing a recording magnetic field from a head to efficiently apply a perpendicular component of the recording magnetic field to the magnetic recording layer at the time of recording a signal on the medium. As the material of the soft magnetic under layer, a material having soft magnetic characteristics, such as a FeCo-based alloy, a CoZrNb-based alloy or a CoTaZr-based alloy can be used. It is particularly preferable that the soft magnetic layer is of an amorphous structure, because taking an amorphous structure is effective in preventing an increase in surface roughness (Ra) and enables a reduction in the amount of floating of the head and further increasing the recording density. Not only the single soft magnetic layer using these materials are used as a soft magnetic under layer, but also a soft magnetic under layer including two soft magnetic layers between which an extremely thin nonmagnetic thin film of Ru is interposed to impart AFC is often used. The total thickness of the soft magnetic under layer is from about 20 to 120 nm. However, it is appropriately determined according to the balance between the recording and reproducing characteristics, and the OW characteristics.

The orientation control layer is constituted of a plurality of layers and includes so-called seed and intermediate layers from the nonmagnetic substrate side. The seed layer has the function of controlling the grain size and crystal alignment of the intermediate layer and the magnetic recording layer. The material of the seed layer is preferably Ta, Ni having a (111) plane-aligned face-centered cubic crystalline structure, or a Ni alloy such as Ni—Nb, Ni—Ta, Ni—V or Ni—W.

When the soft magnetic under layer has an amorphous structure, Ra may increase according to the material and film forming conditions. Therefore, surface roughness: Ra is decreased by forming a nonmagnetic amorphous layer between the soft magnetic under layer and the seed layer, thus making it possible to improve the alignment of the magnetic recording layer.

Similar to the magnetic recording layer, the material of the intermediate layer is preferably a material having a hexagonal closest-packed structure, such as Ru, Re, or an alloy thereof. Since the intermediate layer has the function of controlling the alignment of the magnetic recording layer, the material for controlling the alignment of the magnetic recording layer can be used even without any limitation if it does not have a hexagonal closest-packed structure. The total thickness of the orientation control layer is preferably 5 (nm) or more and 20 (nm) or less according to the balance between the recording and reproducing characteristics, and the overwrite characteristics. A magnetic recording layer having a granular structure is used in the magnetic recording layer of the present invention. However, when the intermediate layer has large surface unevenness, segregation to the crystal grain boundaries of the nonmagnetic oxide or nitride is promoted. Therefore, the gas pressure at the time of film forming of the intermediate layer is preferably 3 (Pa) or more, and more preferably 10 (Pa) or more.

The magnetic recording layer of the present invention includes a first magnetic recording layer including grain boundaries made of an oxide or nitride, and a surface unevenness control layer and a second magnetic recording layer including no grain boundaries made of an oxide or nitride laminated on the first magnetic recording layer in this order. Examples of the material of the first magnetic recording layer include CoCrPt—O, CoCrPtRu—O, CoCrPt—$SiO_2$, CoCrPt—$Cr_2O_3$, CoCrPt—$TiO_2$, CoCrPt—$ZrO_2$, CoCrPt—$Nb_2O_5$, CoCrPt—$Ta_2O_5$, CoCrPt—$B_2O_3$, CoCrPt—$WO_2$, CoCrPt—$WO_3$ and CoCrPt—$RuO_2$. Two or more kinds of oxides can also be added. A nitride can also be used in place of the oxide.

The average grain size of magnetic crystal grains forming the first magnetic recording layer is preferably 3 (nm) or more and 12 (nm) or less. The average grain boundary width is preferably 0.3 (nm) or more and 2.0 (nm) or less. The average crystal grain size and the average grain boundary width can be calculated using planar TEM observation images. The total amount of the oxide existing in the first magnetic recording layer is preferably from 3 to 15 (mol %). When the total amount of the oxide is within the above range, a satisfactory granular structure can be formed.

The surface unevenness control layer of the present invention is used so as to decrease the surface unevenness of the first magnetic recording layer as small as possible, and thus the second magnetic recording layer formed thereon becomes a more uniform continuous film, resulting in uniform exchange interaction in the in-plane direction of the second magnetic recording layer. It is preferable that the surface unevenness control layer of the present invention is formed under a low gas pressure so as to increase the effect of a flattening of the surface. It is effective to increase the film thickness of the surface unevenness control layer to as large as possible so as to decrease the surface unevenness. When the film thickness of the surface unevenness control layer exceeds a certain film thickness, the exchange interaction (in perpendicular direction) between the first magnetic recording layer and the second magnetic recording layer is converted into an antiferromagnetic bond from a ferromagnetic bond and thus the effect of uniformizing the exchange interaction of the second magnetic recording layer disappears. Therefore, in the present invention, it is preferable to introduce a process of heating a nonmagnetic substrate so as to improve the flattening of the surface unevenness control layer by thermal energy.

The order of the step of heating the nonmagnetic substrate of the present invention is not particularly limited as long as it enables a flattening of the surface unevenness control layer. For example, the nonmagnetic substrate may be heated before forming of the surface unevenness control layer. Alternatively, the nonmagnetic substrate may be heated after forming of the surface unevenness control layer. Before and after forming of the surface unevenness control layer, the nonmagnetic substrate can also be continuously heated. However, in view of the point capable of efficiently performing flattening of the surface unevenness control layer by facilitating control of the heating temperature, the heating step is provided after forming of the surface unevenness control layer.

With respect to the heating temperature of the nonmagnetic substrate, in the case of heating after forming of the surface unevenness control layer, the substrate temperature immediately after heating is preferably controlled within a range from 150 to 250° C., and more preferably from 180 to 230° C. When the substrate temperature is lower than the above temperature range, the flattening effect cannot be expected. In contrast, when the substrate temperature is higher than the above temperature range, thermal energy is transferred to the first magnetic recording layer below the surface unevenness control layer and thus it becomes impossible to maintain a granular structure constituted of magnetic crystal grains and grain boundaries made of an oxide or nitride. In the case of heating before forming of the surface unevenness control layer film, the granular structure of the first magnetic recording layer may be broken. Therefore, it is necessary to set a temperature range within a comparatively low temperature range and, specifically, the substrate temperature immediately after heating is preferably controlled within a range from 90 to 170° C.

The step of heating a nonmagnetic substrate of the present invention is preferably performed by introducing a mixed gas prepared by adding an oxygen or nitrogen gas to an argon gas. When the nonmagnetic substrate is heated while introducing the mixed gas, the granular structure of the first magnetic recording layer is hardly broken.

It is preferable that the heating time of the nonmagnetic substrate of the present invention is set within a range from 3 to 10 seconds so as to achieve the above effect.

The material of the surface unevenness control layer of the present invention preferably has a face-centered cubic structure with a (111) crystal plane equivalent to a (002) closest packed face of a hexagonal closest-packed structure. It is also preferable to use the surface unevenness control layer of the face-centered cubic structure in combination with that of the hexagonal closest-packed structure. Furthermore, the material, which contains at least one element selected from the group of elements having a face-centered cubic structure as a main component, and also has an irregular layer lattice (stacking fault) formed by mixing a face-centered cubic structure with a hexagonal closest-packed structure or a body-centered cubic structure, is also preferred. It is also possible to use a Co alloy which contains 40 (atomic %) or more of Co and 10 (atomic %) or less of Cr. In the case of the Co alloy containing 10 (atomic %) or more of Cr, segregation of Cr to grain boundaries is promoted by heating, like a longitudinal magnetic recording medium, resulting in decreased flattening effect. In the Co alloy, the content of Co is more preferably within a range from 40 to 75 atomic % and the content of Cr is more preferably within a range from 0 to 10 atomic %, so as to achieve the above effect.

The second magnetic recording layer of the present invention becomes a continuous film, regardless of the degree of separation of crystal grains of the film below the second magnetic recording layer, as a result of formation of a film on the flattened surface unevenness control layer, resulting in uniform exchange interaction in the in-plane direction. As the material of the second magnetic recording layer, CoCrPt, CoCrPtB and CoCrPtB—X are used. It is also possible to use a soft magnetic material which is used in an ECC medium.

Figure 2A:
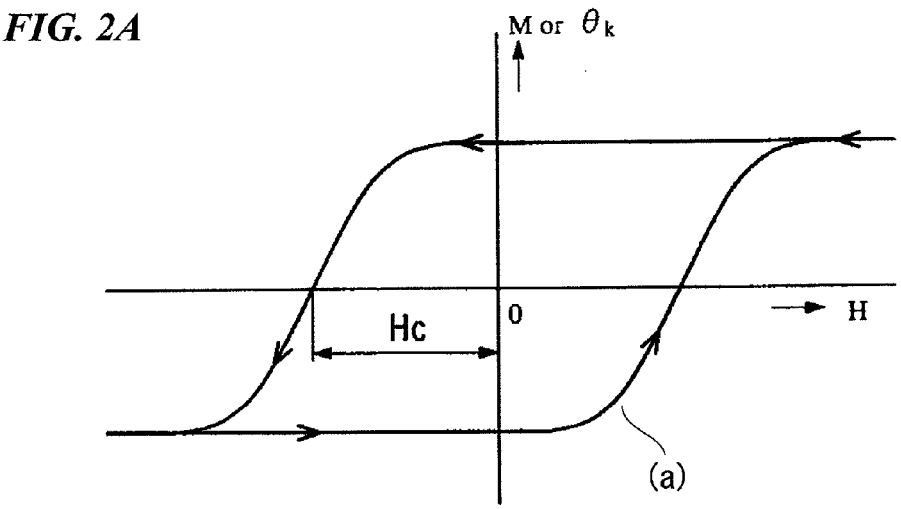
FIG. 2A is a graph for explaining a method for determining coercive force distribution.
Figure 2B:
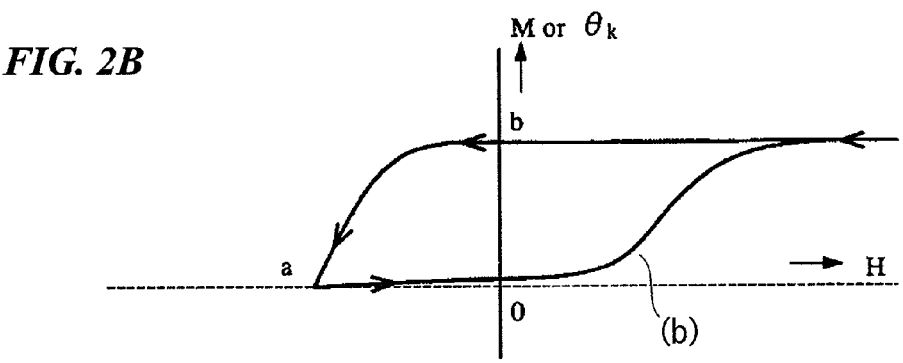
FIG. 2B is a graph for explaining a method for determining coercive force distribution.
Figure 2C:
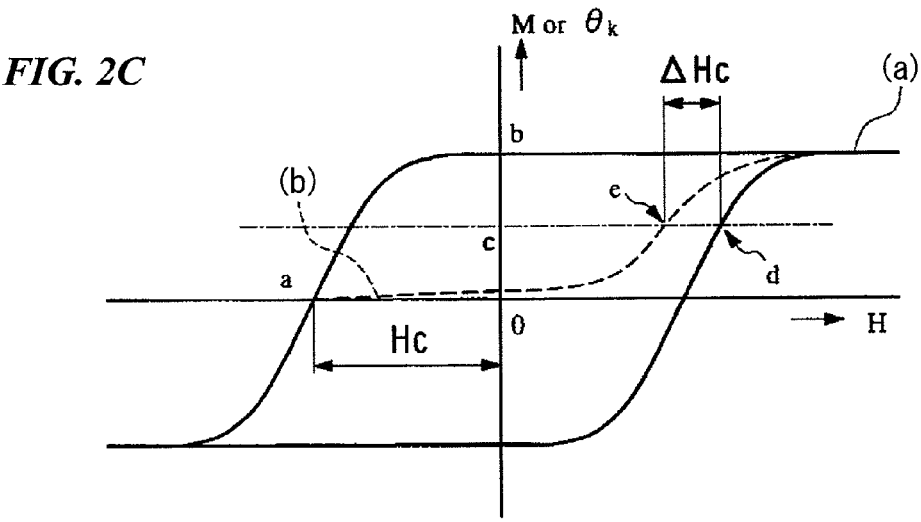
FIG. 2C is a graph for explaining a method for determining coercive force distribution.

As a means for evaluating uniformity of the exchange interaction, coercive force distribution: ΔHc/Hc which represents distribution of magnetization inversion is exemplified. Coercive force distribution can be determined by a VSM or Kerr measuring apparatus. As shown in FIG. 2A, an M-H curve or $\theta_k$-H curve of the medium is determined by a conventional method. This is called a loop A and is indicated by the symbol (a) in FIG. 2A and FIG. 2C. As shown in FIG. 2B, an external magnetic field is decreased from a state where the magnetization is saturated and the sweep direction of the external magnetic field is inverted at the point "a" where M or $\theta_k$ becomes 0, and then the external magnetic field is increased again until the magnetization is saturated. The resultant curve is called a loop B and is indicated by the symbol (b) in FIG. 2B and FIG. 2C. The point where the external magnetic field becomes 0 in the process of decreasing the external magnetic field from a state where the magnetization is saturated is called the point "b". As shown in FIG. 2C, the midpoint between the point "b" and the origin is called the point "c", and a line parallel to the H-axis is drawn from here. The intersection point of the parallel line and the loop A ((a) in the drawing) is called the point "d", the intersection point of the parallel line and the loop B ((b) in the drawing) is called the point "e", and the difference between the point "d" and the point "e" is called ΔHc. ΔHc is divided by Hc of the medium to obtain coercive force distribution: ΔHc/Hc. In order to obtain uniform exchange interaction, the value of ΔHc/Hc is preferably 0.25 or less.

DC magnetron sputtering or RF sputtering is usually used for formation of the above respective layers. It is also possible to use RF bias, DC bias, pulse DC, pulse DC bias, $O_2$ gas, $H_2O$ gas, $H_2$ gas and $N_2$ gas. The sputtering gas pressure is appropriately determined so as to optimize characteristics of every layer, but is usually controlled to be within a range from about 0.1 to 30 (Pa). It is adjusted while confirming performances of the medium.

The protective layer is a layer for protecting the medium from damage caused by contact with a head. A carbon film or a SiO$_2$ film etc. is used as the protective layer, and the carbon film is ordinarily used. For forming of the film, a sputtering or plasma CVD method etc. is used, and the plasma CVD method has been ordinarily used in recent years. A magnetron plasma CVD can also be used. The film thickness is from about 1 (nm) to 10 (nm), preferably from about 2 (nm) to 6 (nm), and more preferably from 2 (nm) to 4 (nm).

Figure 3:
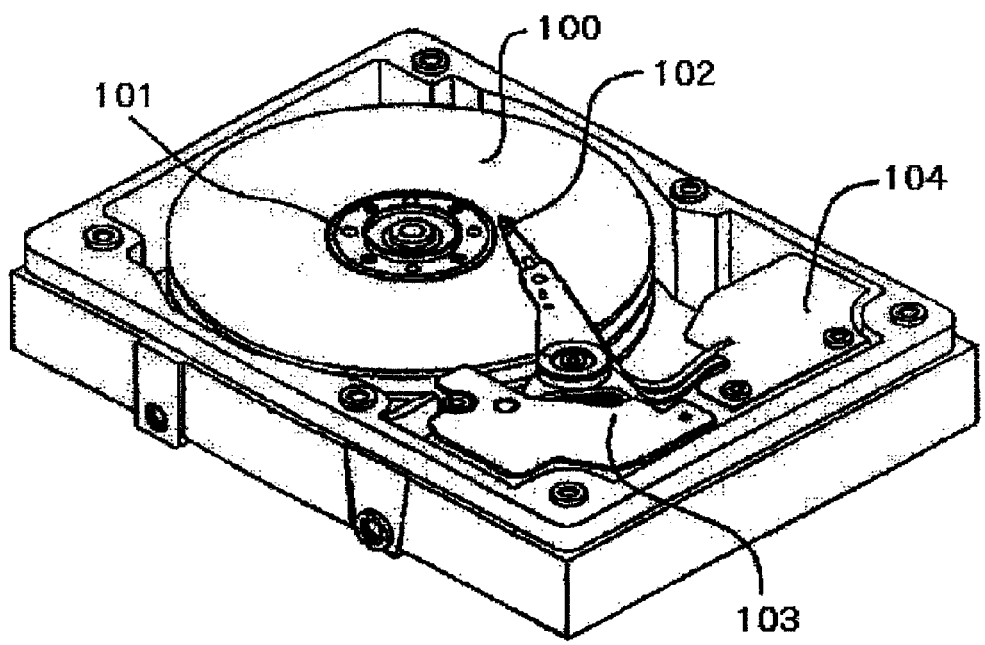
FIG. 3 is a diagram showing a structure of a perpendicular magnetic recording and reproducing apparatus of the present invention.

FIG. 3 shows an example of a perpendicular magnetic recording and reproducing apparatus using the above perpendicular magnetic recording medium. The perpendicular magnetic recording and reproducing apparatus shown in FIG. 3 includes the magnetic recording medium 100 having the structure shown in FIG. 1, a medium drive unit 101 which drives and rotates the magnetic recording medium 100, a magnetic head 102 which records information on the magnetic recording medium 100 or reproduces information from the magnetic recording medium 100, a head drive unit 103 which moves the magnetic head 102 relative to the magnetic recording medium 100, and a recording and reproduction signal processing system 104.

The recording and reproduction signal processing system 104 can process data supplied from the outside to obtain a recording signal, supply the recording signal to the magnetic head 102, and process a reproduction signal from the magnetic head 102 to send data to the outside.

As the magnetic head 102 used in the magnetic recording and reproducing apparatus of the present invention, not only a magneto-resistive (MR) element utilizing anisotropic magnetic resistance (AMR) as a reproducing element, but also any of the magnetic heads suitable for higher-density magnetic recording, those having a GMR element using a giant magneto-resistive (GMR) effect and a TuMR element using a tunneling effect can be used.

EXAMPLES

The present invention will be explained below by way of Examples.

Example 1, Comparative Example 1

A vacuum chamber in which a glass substrate for HD was set was evacuated in advance to become $1.0\times10^{-5}$ (Pa) or less.

Subsequently, as a soft magnetic under layer, a Co10Ta5Zr film having a thickness of 20 (nm), a Ru film having a thickness of 0.6 (nm) and a Co10Ta5Zr film having a thickness of 20 (nm) were formed on the substrate in an Ar atmosphere at a gas pressure of 0.6 (Pa). Subsequently, as a seed layer, a Ni10W film having a thickness of 8 (nm) was formed at 0.6 (Pa) in an Ar atmosphere. As an intermediate layer, a Ru film having a thickness of 10 (nm) was formed at a gas pressure of 0.6 (Pa) and a Ru film having a thickness of 10 (nm) was formed at 10 (Pa), in an Ar atmosphere.

As a first magnetic recording layer, a 91(Co15Cr20Pt)-9(SiO$_2$) (mol %) film having a thickness of 10 (nm) was formed at 5 (Pa) in an Ar atmosphere. As a surface unevenness control layer, a Pt film, a film having a laminated structure of Pd and Ru, a Pt50Cr film, a Pt50Ti film and a Co30Ta film were formed in each thickness of 0.6, 0.6/0.4, 1.2, 1.2 and 1.8 (nm) at a gas pressure of 0.6 (Pa) (Examples 1-1 to 1-5). Subsequently, the substrate was heated at 200° C. for 8 seconds. As a second magnetic recording layer, a Co20Cr15Pt5B film having a thickness of 7 (nm) was formed at a gas pressure of 0.6 (Pa) in an Ar atmosphere. In Comparative Examples, no surface unevenness control layer (with or without heating of a substrate heating), a Pt film, a film having a laminated structure of Pd and Ru, a Pt50Cr film, a Pt50Ti film and a Co30Ta film were formed in each thickness of 0.6, 0.6/0.4, 1.2, 1.2 and 1.8 (nm) at a gas pressure of 0.6 (Pa). Without heating a substrate, a second magnetic recording layer was formed (Comparative Examples 1-1 to 1-7). As a protective layer, a C film was formed to obtain a perpendicular magnetic recording medium.

To the resultant perpendicular magnetic recording media (Examples 1-1 to 1-5 and Comparative Examples 1-1 to 1-7), a lubricant was applied, and the recording and reproducing characteristics were evaluated by using a Read Write Analyzer 1632 and a Spinstand S1701MP manufactured by Guzik, USA. Subsequently, magnetostatic characteristics were evaluated by a Kerr measuring apparatus. Also, surface unevenness of the second magnetic recording layer was observed from cross-sectional TEM images.

With respect to Examples and Comparative Examples, the measurement results of high signal-to-noise ratio: SNR, coercive force: Hc, reverse magnetic domain nucleus forming magnetic field: −Hn, ΔHc/Hc, and Ra of the second magnetic recording layer surface are shown in Table 1. In Table 1, with respect to the crystal structure of the surface unevenness control layer, a face-centered cubic structure was abbreviated to fcc, a hexagonal closest-packed structure was abbreviated to hcp, and a body-centered cubic structure was abbreviated to bcc.

As is apparent from Table 1, in Examples, both ΔHc/Hc and Ra show values smaller than those of Comparative Examples and it is considered that distribution of the exchange interaction was suppressed by flattening thereby improving SNR. The reason why ΔHc/Hc is not improved, even though Ra in a condition with heating is smaller than that in a condition without heating when an unevenness control layer is absent, is considered that distribution of the exchange interaction increased as a result of segregation of Cr of a CoCrPtB film, as the second magnetic recording layer, caused by heating.

TABLE 1

| Samples | Surface unevenness control layer | Crystalline structure | Film thickness (nm) | Heating of substrate | SNR (dB) | Hc (Oe) | −Hn (Oe) | ΔHc/Hc | Ra (nm) |
|---|---|---|---|---|---|---|---|---|---|
| Example 1-1 | Pt | fcc | 0.6 | 200° C. | 16.3 | 4201 | −1941 | 0.22 | 1.9 |
| Example 1-2 | Pd/Ru | fcc/hcp | 0.6/0.4 | 200° C. | 16.4 | 4253 | −1933 | 0.22 | 1.7 |
| Example 1-3 | Pt50Cr | fcc + bcc | 1.2 | 200° C. | 16.8 | 4283 | −2142 | 0.19 | 1.2 |
| Example 1-4 | Pt50Ti | fcc + hcp | 1.2 | 200° C. | 16.9 | 4268 | −2205 | 0.20 | 1.1 |
| Example 1-5 | Co30Ta | fcc | 1.8 | 200° C. | 16.9 | 4193 | −2239 | 0.17 | 0.7 |
| Comparative Example 1-1 | None | — | 0 | 200° C. | 14.5 | 4128 | −1824 | 0.35 | 2.3 |
| Comparative Example 1-2 | None | — | 0 | None | 14.8 | 4219 | −2041 | 0.33 | 3.6 |
| Comparative Example 1-3 | Pt | fcc | 0.6 | None | 15.2 | 3985 | −1904 | 0.31 | 3.4 |

TABLE 1-continued

| Samples | Surface unevenness control layer | Crystalline structure | Film thickness (nm) | Heating of substrate | SNR (dB) | Hc (Oe) | −Hn (Oe) | ΔHc/Hc | Ra (nm) |
|---|---|---|---|---|---|---|---|---|---|
| Comparative Example 1-4 | Pd/Ru | fcc/hcp | 0.6/0.4 | None | 15.0 | 3906 | −1853 | 0.31 | 3.3 |
| Comparative Example 1-5 | Pt50Cr | fcc + bcc | 1.2 | None | 15.5 | 3973 | −1893 | 0.29 | 2.7 |
| Comparative Example 1-6 | Pt50Ti | fcc + hcp | 1.2 | None | 15.4 | 3956 | −1953 | 0.30 | 2.7 |
| Comparative Example 1-7 | Co30Ta | fcc | 1.8 | None | 15.7 | 3899 | −2011 | 0.28 | 2.4 |

INDUSTRIAL APPLICABILITY

The perpendicular magnetic recording medium and the magnetic recording and reproducing apparatus using the magnetic recording medium of the present invention can be used in the field of an information technique, and has high industrial applicability.

The invention claimed is:

1. A method for manufacturing a magnetic recording layer constituted of two or more layers, wherein a soft magnetic under layer is formed directly on a nonmagnetic substrate, and an orientation control layer is formed on the soft magnetic under layer, the method comprising
a step of forming a first layer of the magnetic recording layer having a granular structure constituted of ferromagnetic crystal grains and crystal grain boundaries made of a nonmagnetic oxide or nitride on the orientation control layer,
a step of forming a surface unevenness control layer on the first layer of the magnetic recording layer for decreasing surface unevenness of the first layer of the magnetic recording layer located between the first layer of the magnetic recording layer and a second layer of the magnetic recording layer,
a step of forming the second layer of the magnetic recording layer constituted only of ferromagnetic crystal grains on the surface unevenness control layer, and
a step of heating the nonmagnetic substrate after formation of the surface unevenness control layer so as to decrease a surface roughness Ra of the second layer of the magnetic recording layer to less than 2 nm, wherein
at least one layer of the surface unevenness control layer is made of an alloy material which contains at least one element selected from the group of elements having a face-centered cubic structure as a main component, and elements selected from the group of elements having a body-centered cubic structure,
and also has both a (111) plane-aligned crystalline structure and an irregular layer lattice formed by mixing a face-centered cubic structure with a body-centered cubic structure.

2. The method according to claim 1, wherein the film thickness of the surface unevenness control layer is within a range from 0.5 to 3 nm.

3. The method according to claim 1, wherein at least one layer of the surface unevenness control layer further has a hexagonal closest-packed structure.

4. The method according to claim 1,
wherein at least one layer of the surface unevenness control layer is made of an alloy material which contains at least one element selected from the group of elements having a face-centered cubic structure as a main component, and elements selected from the group of elements having a hexagonal closest-packed structure,
and also has both a (111) plane-aligned crystalline structure and an irregular layer lattice formed by mixing a face-centered cubic structure with a hexagonal closest-packed structure.

5. The method according to claim 1,
wherein at least one layer of the surface unevenness control layer is made of a Co alloy,
which contains 40 atomic % or more of Co and 10 atomic % or less of Cr.

6. The method according to claim 1, wherein the nonmagnetic substrate is heated at a temperature within a range from 150 to 250° C.

7. The method according to claim 6, wherein the nonmagnetic substrate is heated within a range from 3 to 10 seconds.

* * * * *